United States Patent [19]

Keener

[11] 4,305,194

[45] Dec. 15, 1981

[54] DISASSEMBLY TOOL

[75] Inventor: John K. Keener, Rabun Gap, Ga.

[73] Assignee: William G. McClure, Dillard, Ga. ; a part interest

[21] Appl. No.: 139,717

[22] Filed: Apr. 14, 1980

[51] Int. Cl.[3] .............................................. B23P 19/02

[52] U.S. Cl. ...................................................... 29/251

[58] Field of Search ................. 29/251, 252, 259, 226, 29/227, 225; 254/10.5

[56] References Cited

U.S. PATENT DOCUMENTS

| | | | |
|---|---|---|---|
| 1,426,835 | 8/1922 | Mohrman | 29/259 |
| 3,078,556 | 2/1963 | Carroll | 29/226 |
| 3,216,098 | 11/1965 | Ratz | 29/226 |
| 3,368,266 | 2/1968 | Schultz | 29/226 |
| 3,814,382 | 6/1974 | Castoe | 254/10.5 |
| 4,031,603 | 6/1977 | Shultz | 29/259 X |

*Primary Examiner*—Robert C. Watson

*Attorney, Agent, or Firm*—James B. Middleton

[57] ABSTRACT

An apparatus for disassembling a clutch drum of an automatic transmission is provided. The apparatus is a tool having arcuate feet to engage a large area of the plate of the clutch drum assembly, a pair of legs to hold the feet, and a beam along which the legs are slidable. A shank centrally of the beam is to be held by the chuck of a press, and the press is used to compress the springs. The clutch drum is allowed to be placed on the table of a press, the tool is put in place on the plate, and the press can quickly compress the springs while the locking ring is removed.

1 Claim, 4 Drawing Figures

DISASSEMBLY TOOL

FIELD OF THE INVENTION

This invention relates generally to disassembly tools, and is more particularly concerned with a tool and method for disassembly of spring-urged parts.

BACKGROUND OF THE INVENTION

There are numerous instances wherein a part to be removed is under considerable spring tension. For the disassembly of such parts, it is generally necessary to compress the springs to remove the spring tension, then to remove appropriate parts while the springs are held in a compressed state, and finally to release the springs gradually to prevent a forceful expulsion of parts. This problem has become quite pronounced in the clutch drum of automatic transmission for automobiles and the like. For service of the clutch drum, the spring assembly must be removed, and there is tension against a locking ring or the like providing a force of perhaps thirty to fifty pounds. Further, in the clutch drum assembly, the spring tension is exerted around the full circumference of a circle so that the upper plate must be held substantially throughout the circular area in order to compress the springs and remove the spring tension. Pressure in only a few spots around the plate can result in deformation of the plate and/or the inadvertent expulsion of one or more individual springs that are not held.

The prior art method and apparatus for removing parts held under spring tension comprises generally the supporting of a nut adjacent to the piece to be compressed, extending a threaded rod through the nut, and providing an appliance at one end of the threaded rod to bear against the piece to be depressed. Rotation of the nut, then, urges the rod in the appropriate direction to cause the appliance to compress the springs and remove tension in the appropriate piece. While such a technique is effective, it is extremely slow in that the apparatus must be assembled, and the nut must be rotated slowly with a wrench or the like for gradual compression of the springs. Once the springs are sufficiently compressed, the appropriate part can be removed; then, the nut must be rotated in the opposite direction to relieve the spring tension gradually and allow total disassembly of the part in question.

SUMMARY OF THE INVENTION

The present invention overcomes the above mentioned and other difficulties with the prior art tools and methods by providing a tool for use in conjunction with a conventional press, the press including chuck means, and means for reciprocating the chuck means. The tool of the present invention includes pressing means generally conforming to the surface to be pressed, the pressing means being carried at the ends of extending legs. In the preferred form of the invention the legs may be adjustable towards and away from each other, though of course the legs may be fixed if desired. The legs are carried by a beam, and the beam includes generally centrally disposed shank means for engagement with the chuck of the press. The method of the present invention therefore includes the steps of supporting the apparatus to be disassembled adjacent to a press with the chuck means of the press substantially coaxially aligned with the circular plate to be depressed. The shank of the tool is engaged with the chuck, and the pressing means of the tool are adjusted to engage the plate to be depressed. In this condition, the chuck of the press is lowered, through the conventional means, to depress the plate and compress the springs. The press is held in this condition while the appropriate disassembly is made, and the press may be allowed to rise gradually so that final disassembly can be accomplished. Thus, the present invention provides an extemely simple tool and method for disassembly of the clutch drum in automatic transmissions, the tool being quite rugged and easily adjustable as well as sufficiently versatile to be used on virtually any clutch drum.

BRIEF DESCRIPTION OF THE DRAWINGS

These and other features and advantages of the present invention will become apparent from consideration of the following specification when taken in conjunction with the accompanying drawings in which.

DESCRIPTION OF THE PREFERRED EMBODIMENT

Figure 1:
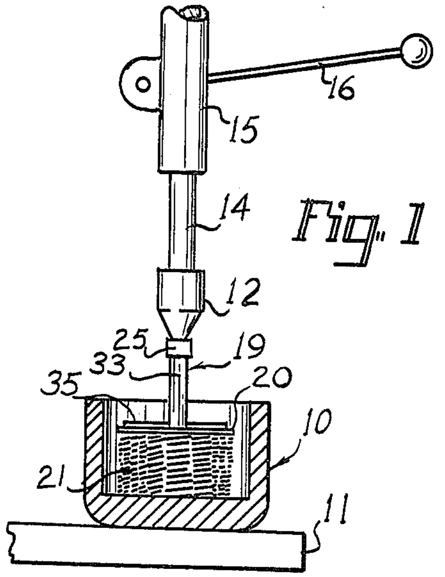
FIG. 1 is a partial side elevational view of a conventional press shown with a tool made in accordance with the present invention in position for disassembly of a clutch drum.

Referring now more particularly to the drawings, and to that embodiment of the invention here chosen by way of illustration, FIG. 1 of the drawing discloses a conventional clutch drum generally designated at 10 supported on a table 11. Above the table 11 there is a chuck 12 carried at the end of a shaft 14, the shaft 14 being reciprocable within a housing 15. The arrangement is such that a lever 16 causes vertical reciprocation of the shaft 14 in the housing 15, thereby to raise or lower the chuck 12.

While any of numerous conventional presses or the like may be used in conjunction with the present invention, the arrangement here shown is a conventional drill press. The conventional drill press utilizes a rack and pinion arrangement to cause the shaft to reciprocate, the pinion being moved by means of the lever 16. Also, the conventional drill press has a work table such as the table 11, the table conventionally being movable to dispose the table 11, in any desired position. It will of course be understood that a conventional drill press has a chuck 12 which can grasp a round object; and, while this is a convenient feature for use in the present invention, it should be fully understood that numerous other forms of connection between the tool and the press can be utilized to achieve the same result.

Returning now to FIG. 1 of the drawings, it will be seen that the chuck 12 holds the shank 18 of the tool 19. The lower end of the tool 19 then bears against the plate 20 of the clutch drum 10, and the plate 20 can be moved down by moving the lever 16 down, thereby to compress the plurality of springs 21.

Figure 2:
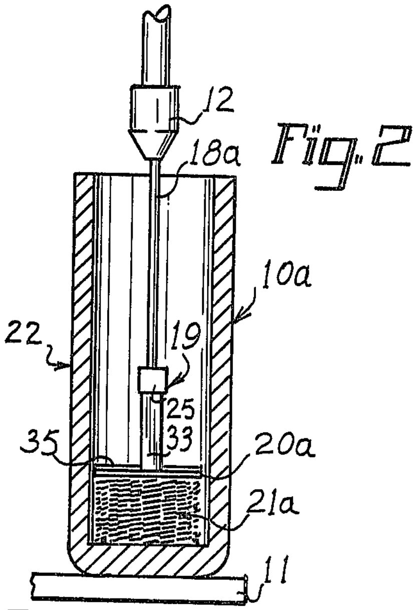
FIG. 2 is a view similar to FIG. 1 showing a slightly modified form of the tool of the present invention being utilized in a different variety of clutch drum.

Looking now at FIG. 2 of the drawings, there is shown a different form of clutch drum, the clutch drum in FIG. 2 being designated at 10*a*. While the plate 20*a* and the springs 21*a* are arranged in substantially the same manner as those shown in FIG. 1 of the drawings, it will be seen that the clutch drum 10a in FIG. 2 of the drawing includes a very deep housing 22. When the tool 19 of the present invention is being used in conjunction with a deep housing such as the housing 22, the only required change is to substitute a longer shank 18a for the shorter shank 18. Of course the table 11 may be lowered and other such adjustments made to accommodate the apparatus. Otherwise, it will be understood that the technique for use of the tool 19 is the same as previously described.

Figure 3:
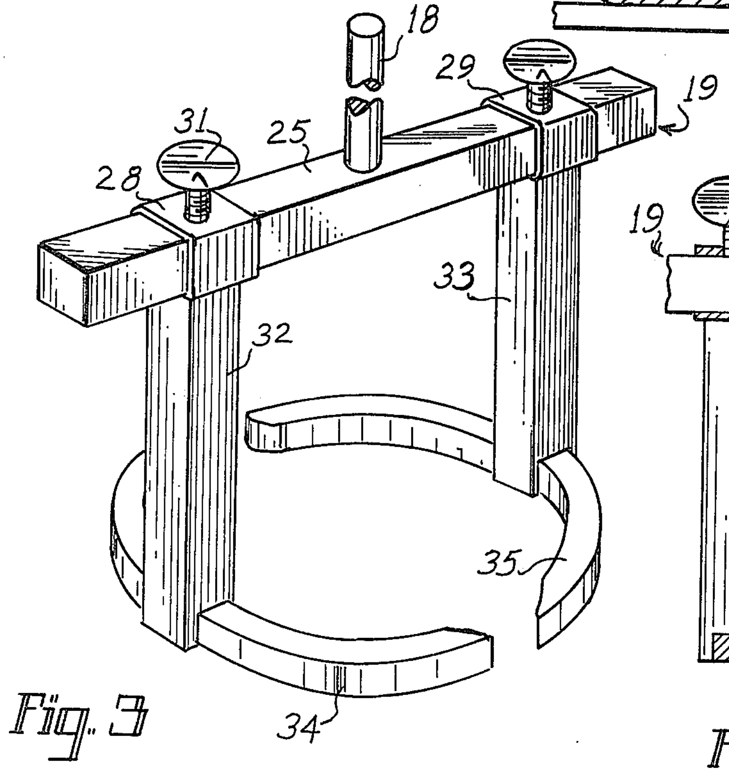
FIG. 3 is a perspective view showing a tool made in accordance with the present invention; and, FIG. 4 is a partial cross-sectional view of the tool shown in FIG. 3.
Figure 4:
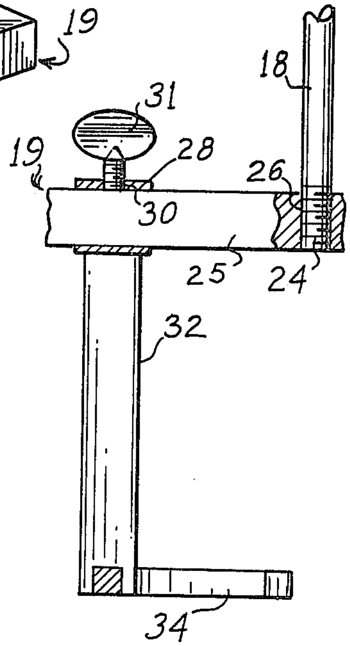

Attention is next directed to FIGS. 3 and 4 of the drawings which disclose the tool 19 in more detail. Here it will be seen that the tool 19 includes the shank 18 which comprises a rod of any desired length, the lowermost end 24 being appropriately threaded. The shank 18 carries a beam 25 at the lower end thereof, the beam 25 having a threaded hole 26 for receiving the threaded end 24 of the shank 18. It will be understood by those skilled in the art that the hole 26 is preferably centered along the beam 25 as will be discussed in more detail hereinafter.

Each end of the beam 25 carries a slidable sleeve, such as the sleeves 28 and 29. The sleeve 28 generally conforms to the cross-sectional shape of the beam 25, and it is so sized as to be a sliding fit. The sleeve 28 includes a threaded aperture 30 which receives a setscrew 31. The setscrew 31 is here shown as being a thumb screw, though it will of course be understood that wing nuts, Allen screws and the like will be useable if desired.

The bottom of the sleeve 28 has a leg 32 depending therefrom. It is contemplated that the leg 32 would be welded or otherwise affixed to the sleeve 28 so that the leg 32 would be quite rigid with respect to the sleeve 28. Similarly, there is a leg 33 depending from the sleeve 29.

At the lowermost end of the leg 32, there is an arcuate presser foot 34. The presser 34 is here shown as rectangular in cross-section, and generally circular in plan view. There is a complementary presser foot 35 carried by the lower end of the leg 34, the presser foot 35 being substantially a mirror image of the presser foot 34.

From the foregoing it should be understood that a clutch drum such as the clutch drum 10 has a plate 20 having the plurality of springs 21 bearing thereagainst. When this assembly is to be removed, the plate 20 must be substantially uniformly pressed and held while a locking ring is removed. Once the locking ring is removed, the plate 20 can move entirely out of the clutch drum 10, leaving the springs 21 free. Since clutch drums such as the clutch drum 10 are made in various diameters, the tool 19 of the present invention needs to be adjustable to accommodate the various diameters. For this purpose the sleeves 28 and 29 are movable along the beam 25, and fixable, by means of the setscrews 31, in the desired location.

It is important to note that the presser feet 34 and 35 must engage a substantial portion of the plate such as the plate 20. Due to the force of the plurality of springs 21 completely around the plate 20, if a large area around the plate 20 is left unsupported the springs 21 will provide sufficient force to warp the plate 20.

Because of the foregoing requirements, the presser feet 34 and 35 may be made precisely circular in plan view, and a different set of presser feet 34 and 35 with their legs 32 and 33 may be used for different clutch drums. Since the sleeves 28 and 29 are slidable along the beam 25, the sleeves may be completely removed from the beam 25, and other sleeves having the appropriate size of presser feet can be installed for a particular clutch drum. Alternatively, it will be understood that the presser feet 34 and 35 may be shaped with a somewhat average radius so that a sufficient area of the plate 20 can be covered by the presser feet 34 and 35. If this arrangement is used, it is also contemplated that the presser feet 34 and 35 may be made with a hyperbolic curvature in an effort to fit a wide variety of diameters of plates such as plate 20.

In the provision of the beam 25, the arrangement as shown in FIG. 2 of the drawings should be kept in mind. For a more useful tool, it is preferable that the beam 25 be sufficiently short as to be received within the housing such as the housing 22.

From the foregoing description, it should be understood by those skilled in the art that the tool of the present invention is very simple, and is rugged and durable. The tool is further extremely versatile in that a single tool is useable for disassembling a clutch drum of virtually every automatic transmission currently manufactured. The method of the present invention allows the very rapid disassembly of a clutch drum, utilizing a drill press or other press that would generally be found in any transmission shop, thereby obviating the necessity for purchasing additional large equipment.

It of course will be understood by those skilled in the art that the embodiment of the invention here presented is by way of illustration only, and is meant to be in no way restrictive; therefore, numerous changes and modifications may be made, and the full use of equivalents resorted to, without departing from the spirit or scope of the invention as defined in the appended claims.

I claim:

1. A disassembly tool for an automatic transmission clutch drum, said clutch drum including a housing, spring means within said housing bearing against a plate, and locking means securing said plate with respect to said housing, said disassembly tool comprising, in combination, a press having a table, chuck means, and means for moving said chuck means towards and away from said table, presser means for engaging said plate of said clutch drum, leg means for carrying said presser means, a beam, said leg means depending from said beam, and shank means supporting said beam and holdable by said chuck means, said tool further including a pair of sleeves slidably mounted on said beam, said leg means being fixed to said sleeves for selective movement along said beam, and means for selectively fixing said sleeves with respect to said beam, said beam being of such length as to be receivable within said clutch drum housing, and to extend at least the diameter of said plate, said shank means being removably fixed to said beam, said presser means including a pair of arcuate members formed as mirror images of each other, said pair of arcuate members being shaped to engage a substantial portion of said plate.

* * * * *